United States Patent [19]

Kohler et al.

[11] 4,139,597

[45] Feb. 13, 1979

[54] REMOVAL AND RECOVERY OF SULFUR OXIDES FROM GAS STREAMS WITH MELAMINE

[75] Inventors: John J. Kohler, Florence; Joe Gautney, Sheffield; Yong K. Kim; John F. McCullough, both of Florence, all of Ala.

[73] Assignee: Tennessee Valley Authority, Muscle Shoals, Ala.

[21] Appl. No.: 850,784

[22] Filed: Nov. 11, 1977

Related U.S. Application Data

[63] Continuation-in-part of Ser. No. 794,269, May 5, 1977, now Defensive Publication No. T970,008.

[51] Int. Cl.$^2$ ............................................. C01B 17/00
[52] U.S. Cl. .................................................. 423/243
[58] Field of Search ......................... 423/242, 243, 244

[56] References Cited

U.S. PATENT DOCUMENTS

| | | | |
|---|---|---|---|
| 1,783,901 | 12/1930 | Bottoms | 423/243 |
| 3,658,462 | 4/1972 | Van Scoy | 423/243 |

OTHER PUBLICATIONS

Mann et al., "Symposium on Flue Gas Desulfurization", p. 719, EPA 600/2-76-1366, 1976.

*Primary Examiner*—O. R. Vertiz
*Assistant Examiner*—Gregory A. Heller
*Attorney, Agent, or Firm*—Robert A. Petrusek

[57] ABSTRACT

A process for the removal and recovery of sulfur oxides from gas streams by contacting the gas stream with an aqueous suspension of melamine whereupon a mixture of solid, hydrated melamine sulfites, hydrated melamine sulfate is formed. The solids are separated from the reaction product and the clarified liquid recycled. The solids are then heated to temperatures up to 200° C. to decompose the hydrated melamine sulfites into free melamine, gaseous water, and sulfur dioxide, and the gaseous water and sulfur dioxide withdrawn as product. The hot solids are cooled and split into two portions. One portion is recycled and the other portion is treated with a base stronger than melamine to decompose the contained melamine sulfate into free melamine and a basic sulfate salt solution. The basic sulfate salt solution is separated from the melamine and withdrawn as product and the melamine is recycled to the process.

4 Claims, 2 Drawing Figures

Fig. 2

REMOVAL AND RECOVERY OF SULFUR OXIDES FROM GAS STREAMS WITH MELAMINE

The invention herein described may be manufactured and used by or for the Government for governmental purposes without the payment to us of any royalty therefor.

This is a continuation-in-part of application Ser. No. 794,269, filed May 5, 1977, for REMOVAL AND RECOVERY OF SULFUR OXIDES FROM GAS STREAMS WITH MELAMINE now Defensive Publication No. T970,008, published May 28, 1978.

Our invention relates to a newly developed process for the removal and recovery of sulfur oxides from gas streams, more particularly to the contacting of gas streams such as stack gas discharged from electric power plants and other facilities which burn fossil fuel, tail gases from roasting sulfide ores, and tail gases containing sulfur oxides from other processes with an aqueous slurry of melamine to absorb and precipitate the sulfur oxides as melamine sulfites and melamine sulfate, and still more particularly to the regeneration of the melamine and the recovery of the sulfur values as sulfur dioxide and basic sulfate salts by thermal decomposition of the melamine sulfites and by treatment of the melamine sulfate with a base stronger than melamine.

All facilities which burn sulfur-containing fossil fuel to generate electric power, as well as sulfide roasting industries and many other industrial processes, emit sulfur dioxide and smaller amounts of sulfur trioxide in their waste gas streams. Although the concentration of sulfur oxides in the waste gas is usually low, on the order of 0.05 to 0.4 percent by volume, the total amount emitted annually from industries which burn fossil fuel exceeds 15 million tons (Chilton, T. H., "Reducing $SO_2$ Emission from Stationary Sources," Chem. Eng. Progress 67 (5), 69-72, 1971). These emissions present a severe pollution problem and constitute the loss of a valuable natural resource.

The Federal Environmental Protection Agency, under authority of the Clean Air Act, has issued standards which call for a substantial reduction in the amount of sulfur discharged to the atmosphere [Environmental Protection Agency, Standards of Performance for New Stationary Sources, Federal Register 36,247 part II (Dec. 23, 1971), Washington, D.C.]. Compliance with these emission standards may be attained by use of low-sulfur fuel, fuel desulfurization, and gasification processes to make a clean fuel; however, sufficient supplies of such fuels are not now available, and may not be so for some time to come. The alternative is to remove the sulfur dioxide from the waste gas streams.

Many processes for the removal alone and removal with recovery of sulfur oxides from waste gas streams have been proposed ["Sulfur Oxide Removal from Power Plant Stack Gas," McGlamery, G. G., et al, Environmental Protection Technology Series, EPA Report EPA-R2-73-244, May 1973; "Status of Stack Gas Technology for $SO_2$ Control," EPRI Report No. 209, Part II, 1975; "$SO_2$ Abatement for Stationary Sources in Japan," Ando, J. and Isaacs, G. A., Environmental Protection Technology Series, EPA Repot EPA-600/2-76-013a, January 1976; "Flue Gas Desulfurization: An Overview," Slack, A. V., Chem. Eng. Progress 72, 94-97, 1976]. Absorbents such as slurries of metal oxides or hydroxides, aqueous solutions of ammonium and sodium salts, molten alkali salts, and solid absorbents such as sodium aluminate and activated carbon have been evaluated. Of the many processes tested, most were effective in removing sulfur oxides from the waste gas streams but suffered from other defects such as poor economics, difficulty in regeneration of the absorbents, production of large quantities of a sulfur bearing waste product which posed difficult disposal problems, and process conditions which were too stringent to maintain in a commercial installation. Because of these difficulties, at present, no process for the removal of sulfur oxides from waste gas has been accepted on a wide scale by the electrical power industry or other commercial facilities.

It is convenient to divide desulfurization processes into two categories: throwaway processes and regenerative processes. In the former group, the sulfur is recovered from the stack gas in a form not amenable to recovery in a usable form. As the name implies, sulfur is recovered in the so-called regenerative processes in a salable form usually as sulfur, sulfur dioxide, or sulfuric acid.

Because throwaway processes require an inexpensive scrubbing agent, they are all based on calcitic limestone or lime. In limestone scrubbing (McGlamery, G. G. et al, "Detailed Cost Estimates for Advanced Effluent Desulfurization Processes," EPA Report 600/2-75-006, 1975), stack gas is washed with a recirculating slurry of calcite and reacted calcium salts. For highest removal efficiencies, a two-stage scrubber system, consisting of a venturi and mobile bed scrubber, is used to remove both particulate matter and gaseous sulfur oxides. In this process, sulfur dioxide dissolves in water to yield a mixture of sulfite, bisulfite, and hydronium ions.

$$SO_2 + H_2O \rightleftharpoons H_2SO_3 \qquad (1)$$

$$H_2SO_3 + H_2O \rightleftharpoons H_3O^+ + HSO_3^- \qquad (2)$$

$$HSO_3^- + H_2O \rightleftharpoons H_3O^+ + SO_3^{--} \qquad (3)$$

Limestone simultaneously dissolves in the scrubbing liquor as in the reaction

$$CaCO_3 \rightleftharpoons Ca^{++} + CO_3^{--} \qquad (4)$$

The calcium and sulfite ions subsequently react to yield solid calcium sulfite hemihydrate. In the acid environment, carbonate ion decomposes to carbon dioxide.

Part of the sulfite ions also oxidizes to ultimately yield gypsum as shown below:

$$SO_3^{--} + 0.5O_2 \rightarrow SO_4^{--} \qquad (5)$$

$$Ca^{++} + SO_4^{--} + 2H_2O \rightarrow CaSO_4 \cdot 2H_2O \qquad (6)$$

To gain additional sulfur dioxide removal efficiency, lime may be substituted for limestone as a scrubbing agent. In making this substitution, reaction velocity is increased, but the final throwaway products are still $CaSO_3 \cdot 0.5H_2O$ and $CaSO_4 \cdot 2H_2O$.

In spite of the apparent simplicity of the systems, there are substantial operating difficulties. The circulating limestone slurry is erosive, particularly at high circulation rates. This potential for erosion necessitates the use of rubber lining in central areas of the scrubbing system, thus increasing capital costs. Solid deposits on process equipment is another major deterrent to successful operation of limestone or lime slurry processes (Phillips, J. F. "Sulfur Oxide Removal from Power Plant Stack Gas; Lime - Limestone Wet Scrubbing Processes; Conceptual Design and Cost Study; Process Chemistry, Silting and Scaling." Tennessee Valley Authority, p. 133, Sept. 13, 1973). Much research and development has been lavished on this phenomenon, but the problem can be eliminated only by meticulous attention to operating details (Borgwardt, R. H., EPA/RTP "Pilot Studies Related to Unsaturated Operation of Lime and Limestone Scrubbers," p. 225, EPA-650/2-74-126a, 1974).

Inefficient utilization of limestone is also a problem and, in practice, excess limestone is required for adequate sulfur dioxide scrubbing. This unavoidably results in unreacted stone being discarded with the solid waste. The economics of limestone scrubbing are affected by the degree of limestone utilization in two ways: (1) unreacted limestone, which is disposed of with the solid waste, is a direct loss of limestone values and, therefore, increases operating costs; and (2) disposal of unreacted limestone aggravates waste disposal problems by occupying disposal area and, in some cases, interferring with settling and compaction of the solid waste.

Another nonregenerative process is the double alkali process. In this process, sodium sulfite is substituted for lime or limestone as the scrubbing agent. During the scrubbing, sulfur dioxide converts sodium sulfite to sodium bisulfite (Kaplan, N., "Introduction to Double Alkali Flue Gas Desulfurization Technology," Symposium on Flue Gas Desulfurization, New Orleans, March 1976, p. 387, EPA-600/2-76-136a, 1976) as in the reaction $$Na_2SO_3 + SO_2 + H_2O \rightarrow 2NaHSO_3 \tag{7}$$

The spent sulfite liquor is regenerated by contacting it with lime as shown in the reactions $$2NaHSO_3 + Ca(OH)_2 \rightarrow Na_2SO_3 + CaSO_3 \cdot 0.5H_2O + 1.5H_2O \tag{8}$$

$$Na_2SO_3 + Ca(OH)_2 + 0.5H_2O \rightarrow 2NaOH + CaSO_3 \cdot 0.5H_2O \tag{9}$$

Similar reactions are possible with limestone. The insoluble calcium sulfite along with some calcium sulfate formed by oxidation is separated from the solution by settling and decantation. Sodium lost in this operation is replenished with sodium carbonate.

The double alkali process is similar to lime or limestone scrubbing processes in that sulfur dioxide and a calcium base are converted to calcium sulfite and calcium sulfate. By separating the scrubbing and regeneration steps, calcium utilization is increased and scaling problems are greatly reduced. These advantages are achieved at the expense of replenishing losses in the scrubbing liquor with relatively expensive sodium carbonate.

In the nonregenerative processes, the final throwaway product is a thixotropic sludge comprised of fly ash, unreacted limestone or lime, $CaSO_3 \cdot 0.5H_2O$, $CaSO_4 \cdot 2H_2O$, and unreacted dolomite (Phillips, J. F., supra, p. 150). The physical properties of the $CaSO_3 \cdot 0.5H_2O$ is such that fully settled but otherwise untreated sludge rarely settles to more than 50 percent by volume. Based on a 50-percent settled volume and the treatment of all flue gas by throwaway processes, Jones et al [Jones, J. W., Stern, R. D., and Princiotta, F. T., Proceeding:Symposium on Flue Gas Desulfurization (New Orleans, May 1973). Research Triangle Park, N.C.:U.S. EPA, Dec. 1974, pages 187-234 (EPA-650/2-73-038)] Princiotta, F. T., Symposium on Flue Gas Desulfurization, New Orleans, May 1973, estimate that a sludge volume will be generated that is larger than the volume of earth disturbed by the strip and contour mining operations to supply the coal. Disposal of the enormous volume of waste is the major problem with nonregenerative desulfurization processes. The disposal problem is further exacerbated by the fact that the sludge contains water-soluble pollutants that can not be allowed to escape into ground water or streams.

Partly because of the waste disposal problems associated with throwaway processes, numerous regenerative methods of flue gas desulfurization have been developed. Ammonia scrubbing, magnesia scrubbing, sodium scrubbing (Wellman-Lord process), and citrate scrubbing are among some of the more important of the many proposed desulfurization processes. Because these processes produce a salable product, waste disposal problems are greatly reduced. But the wide variety of competing processes testifies to the fact that all have problems and disadvantages.

Ammonia scrubbing is a process which showed great promise (National Fertilizer Development Center, Tennessee Valley Authority, Muscle Shoals, Ala., Bulletin Y-13, October 1970). In this process, ammonia and ammonium sulfite are used to convert sulfur dioxide in the flue gas to ammonium bisulfite as in the reactions $$2NH_3 + SO_2 + H_2O = (NH_4)_2SO_3 \tag{10}$$

$$(NH_4)_2SO_3 + SO_2 + H_2O = 2NH_4HSO_3 \tag{11}$$

As with other processes, oxidation converts part of the sulfite to ammonium sulfate. At least five alternate methods of regenerating the spent scrubber liquor and recovering the sulfur values are available. The options allow production of ammonium sulfate, sulfur dioxide, elemental sulfur, and sulfuric acid as the salable sulfur products.

The Tennessee Valley Authority extensively tested the ammonia scrubbing process for several years but finally abandoned it because an environmentally and esthetically objectionable plume formed when the scrubber off-gas contacted the atmosphere. No economically feasible method of eliminating the plume was developed and the process has fallen into disfavor.

Magnesia scrubbing with sulfur recovery is a stack gas scrubbing method under active study (McGlamery, G. G., et al, EPA R2-73-244, 1973). At least three major technological routes have been followed. American, Japanese, and Russian workers have concentrated on the use of magnesium sulfite-magnesium oxide slurries. The Grillo Werks AG adds $MnO_2$ to the magnesium slurry to increase sulfur dioxide absorption efficiency. Some paper mills use an acidic clear liquor of magnesium sulfite and bisulfite to simultaneously remove particulate matter and absorb sulfur dioxide in a single scrubber. Of the three variations, the basic MgO-MgSO$_3$ slurry process is the most advanced.

The basic MgO-MgSO$_3$ slurry process uses two scrubbers in series; the first scrubber uses water to remove particulate matter and sulfur trioxide and the sulfur dioxide is removed in the second scrubber. The major reactions that occur during the sulfur dioxide scrubbing step are $$Mg(OH)_2 + SO_2 + 5H_2O = MgSO_3 \cdot 6H_2O \tag{12}$$

$$MgSO_3 \cdot 6H_2O + SO_2 = Mg(HSO_3)_2 + 5H_2O \quad (13)$$

The $MgSO_3 \cdot 6H_2O$ precipitates, but the $Mg(HSO_3)_2$ is soluble and is converted to $MgSO_3 \cdot 6H_2O$ by the addition of fresh MgO.

$$MgO + Mg(HSO_3)_2 + 11H_2O = 2MgSO_3 \cdot 6H_2O \quad (14)$$

This conversion is made either in the scrubbing system or in another operation. The precipitated $MgSO_3 \cdot 6H_2O$ is separated and either thermally converted to $MgSO_3 \cdot 3H_2O$ or sent directly to the calcination step. Any $MgSO_4 \cdot 7H_2O$, an oxidation product, in the solution is occluded in the $MgSO_3 \cdot 6H_2O$ crystals and is thus purged from the system.

The magnesium sulfite crystals are calcined between 800° and 1100° C. in the presence of coke or a reducing atmosphere to regenerate MgO and to expel $SO_2$ in the reactions $$MgSO_3 = MgO + SO_2 \quad (15)$$

$$C + 0.5\, O_2 = CO \quad (16)$$

$$CO + MgSO_4 = CO_2 + MgO + SO_2 \quad (17)$$

A major disadvantage of this process is the high temperature calcination of the magnesium sulfite and magnesium sulfate. This step is energy intensive and will become more costly as the cost of fuel increases. The high temperature dryer and bag filters associated with the dryer also adds to the capital costs of the process.

Sodium scrubbing with sulfur recovery (Wellman-Lord) is another process under active development (Pedroso, R. I., Symposium on Flue Gas Desulfurization, New Orleans, p. 719, EPA 600/2-76-136b, 1976). As in the double alkali process, a sodium sulfite solution scrubs sulfur dioxide from the flue gas. The spent bisulfite-rich scrubbing liquor is decomposed by steam stripping to regenerate sodium sulfite and to expel sulfur dioxide as in the reaction $$2NaHSO_3 \underset{\rightleftharpoons}{\text{steam}} Na_2SO_3 + SO_2 \uparrow + H_2O \uparrow \quad (18)$$

The sulfur dioxide is recovered as product and the sodium sulfite returned to the process. Oxidation of the sulfur dioxide and formation of sodium sulfate occurs in the process as would be expected. To control the sodium sulfate level in the scrubbing solution, a side stream is removed and sent to a purge treatment section where the sodium sulfate is crystallized and removed and solid if possible. The mother liquor is returned to the process and the sodium removed as sodium sulfate replaced with sodium carbonate.

Oxidation is the greatest problem associated with the process because it leads to the consumption of sodium carbonate to produce sodium sulfate, which has relatively little value. This oxidation may be partially suppressed with inhibitors such as para-phenylenediamine, but the cost of the inhibitors adds appreciably to the operating costs (Mann, E. L., and Christman, R. C., Symposium on Flue Gas Desulfurization, New Orleans, pp. 703–707, EPA-600/2-76-136b, 1976).

The citric acid process, developed by the U.S. Bureau of Mines, uses a mixture of citric acid, sodium citrate, and sodium thiosulfate to scrub sulfur dioxide from particulate-free gas streams. (Nissen, W. I., Elkins, D. A., and McKinney, W. A., Symposium on Flue Gas Desulfurization, New Orleans, p. 843, EPA-600/2-76-136b, 1976). The process comprises the following steps:

A. Particulate matter and sulfuric acid mist are removed from a cooled gas stream (45° to 65° C.).
B. A sodium citrate, citric acid, and sodium thiosulfate mixture scrubs $SO_2$ from the cool gas stream.
C. The spent scrubbing solution is regenerated by reaction with hydrogen sulfide at 65° C. to yield elemental sulfur by the following reaction $$SO_2 \cdot S_2O_3^= + 2H_2S \rightarrow 3S + 2H_2O + S_2O_3^= \quad (19)$$

D. Sodium sulfate, an oxidation product, is crystallized from a slipstream by cooling.
E. The sulfur product is removed from the regenerated scrubbing solution by oil flotation and fusion.
F. Hydrogen sulfide is manufactured by reacti two-thirds of the recovered sulfur with steam and natural gas.

Two problems immediately stand out in this otherwise interesting process. The disposal of sodium sulfate may pose problems, as was previously mentioned. More serious is the use of natural gas for hydrogen sulfide production. Natural gas is in short supply now and future supplies will, in all probability, become even more scarce and expensive.

Melamine ($C_3N_6H_6$), also known as 2, 4, 6-triamine - 1, 3, 5-triazine, is a stable, white solid melting at 354° C. It is sparingly soluble in water—about 0.4 percent at 25° C. (Chapman, R. P., Averell, P. R., and Harris, R. R., Ind. Eng. Chem., 35, 137–138, 1943). Melamine forms stable, crystalline salts with strong mineral acids and with many organic acids. Most but not all of these salts are sparingly soluble in water (Bann, B., and Miller, S. A., Chem. Rev. 58, 131, 1958).

Since melamine is a weak base ($pK_b$ of 9.0), it can be displaced from its salts by a stronger base such as ammonia (Dixon, J. K., Woodberry, N. T., and Costa, G. W., J. Am. Chem. Soc. 69, 599–603, 1947).

The compound $(C_3N_6H_6)_2 \cdot H_2SO_4 \cdot 2H_2O$ has been prepared and characterized supra. Williams, in a review article (Williams, H. E., "Cyanogen Compounds," 2nd edition, p. 29, Edward Arnold and Co., London, 1948) mentions melamine sulfite and gives its composition as "$C_3N_6H_6 \cdot HSO_3$" and describes it as being in the form of short, rhombic prisms. However, the reference cited by Williams does not mention melamine sulfite, and an exhaustive search of the literature did not reveal any other reference to melamine sulfite.

It is therefore an object of the present invention to provide a practical and economically attractive process for the removal and recovery of sulfur oxides from waste gas streams.

Another object of the present invention is to provide a process which will prevent air pollution caused by the emission of sulfur oxides.

A further object of the present invention is to provide a process which will allow industrial sulfur oxide emissions to meet governmental standards.

A still further object of this invention is to provide a process which will remove sulfur oxides from waste gas streams without the formation of byproducts which will cause a disposal problem.

Our newly developed process is based on the discovery that when a gas stream containing sulfur dioxide is intimately contacted with an aqueous slurry of melamine under the conditions of our process, the major portion of the sulfur dioxide is removed from the gas stream and converted to solid, hydrated melamine sulfites. Furthermore, we discovered that thus produced melamine sulfites are readily decomposed by heating at the relatively moderate temperatures of 105° to 200° C. to form free melamine, sulfur dioxide, and water. We have further found that the melamine slurry also is effective in removing sulfur trioxide from the gas stream as solid, hydrated melamine sulfate and that treatment of the thus produced melamine sulfate with a solution of a base stronger than melamine liberates the melamine and forms a solution of basic sulfate salt. Advantage was taken of these discoveries to develop a new process for the removal and recovery of sulfur oxides from gas streams such as flue gas from electric power plants which comprises the steps of:

1. Contacting the gas with an aqueous slurry of melamine to remove the sulfur oxides as a mixture of solid melamine sulfites and melamine sulfate;
2. Separating the solids from the liquid in the reaction slurry from step 1 supra and recycling the liquid to step 1 supra;
3. Heating the solids from step 2 supra at temperatures up to 200° C. to vaporize adhering liquid and to decompose the melamine sulfite into solid, free melamine and gaseous sulfur dioxide and water;
4. Withdrawing the sulfur dioxide and water vapor from step 3 supra as product;
5. Cooling the hot solids from step 3 supra and splitting the cooled solids into two unequal streams;
6. Recycling the larger stream of cooled solids from step 5 supra back to step 1 supra;
7. Treating the smaller stream of cooled solids from step 5 supra with an aqueous solution of a base stronger than melamine to convert the melamine sulfate contained in the solids to free melamine and a solution of basic sulfate salts;
8. Separating the basic sulfate salt solution from the solid melamine produced in step 7 supra and withdrawing the solution as product; and
9. Washing the solid melamine from step 8 with water, using the wash solution in step 7 supra, and recycling the washed melamine back to step 1 supra.

When sulfur dioxide is dissolved in water, sulfurous acid is formed by the reaction $$SO_2 + H_2O \rightleftharpoons H_2SO_3 \quad (20)$$

Sulfurous acid and water react with melamine to form at least two crystalline salts, $(C_3H_6N_6)_2 \cdot H_2SO_3 \cdot 4H_2O$ and $(C_3H_6N_6)_3 \cdot (H_2SO_3)_2 \cdot 2H_2O$. Which of these salts are formed depends upon the temperature and the concentration of sulfurous acid. The concentration of sulfurous acid in the liquid phase depends upon the temperature and the concentration of sulfur dioxide in the gas stream since the vapor pressure of sulfur dioxide in equilibrium with the sulfurous acid cannot exceed the partial pressure of sulfur dioxide in the gas phase. At temperatures up to at least 56° C., $(C_3H_6N_6)_2 \cdot H_2SO_3 \cdot 4H_2O$ is the stable solid phase at the lower sulfurous acid concentrations. Only this compound is formed when the concentration of sulfur dioxide in the inlet gas is about 0.2 percent or less. When the concentration of sulfur dioxide in the inlet gas is 1 percent or more, $(C_3H_6N_6)_2 \cdot H_2SO_3 \cdot 4H_2O$ is first formed until all of the melamine is consumed and sulfur dioxide is detectable in the exit gas stream. This salt then reacts with more sulfurous acid to form $(C_3H_6N_6)_3 \cdot (H_2SO_3)_2 \cdot 2H_2O$.

Since melamine contains 3 amino groups and sulfurous acid is dibasic, the possibility of a number of other melamine sulfites exists in the system $C_3H_6N_6:SO_2:H_2O$; but, to determine the precise chemistry of the system would require an extensive and prohibitively detailed study of the phase system. However, it is not necessary to have this detailed knowledge to practice our invention.

$(C_3H_6N_6)_2 \cdot H_2SO_3 \cdot 4H_2O$ readily loses two moles of water when dried at room temperature and extended drying results in the loss of additional water and some sulfur dioxide. $(C_3H_6N_6)_3 \cdot (H_2SO_3)_2 \cdot 2H_2O$ is relatively stable during room temperature drying, but it is reasonable to assume that it, too, will lose water and sulfur dioxide on extended drying. All of the hydrated melamine sulfites began to lose water relatively rapidly when dried at temperatures from about 65° C. to 105° C. Some sulfur dioxide is lost also, but at a much lower rate.

Our invention, together with further objects and advantages thereof will be better understood from a consideration of the following description taken in connection with the accompanying drawings in which.

Figure 1:
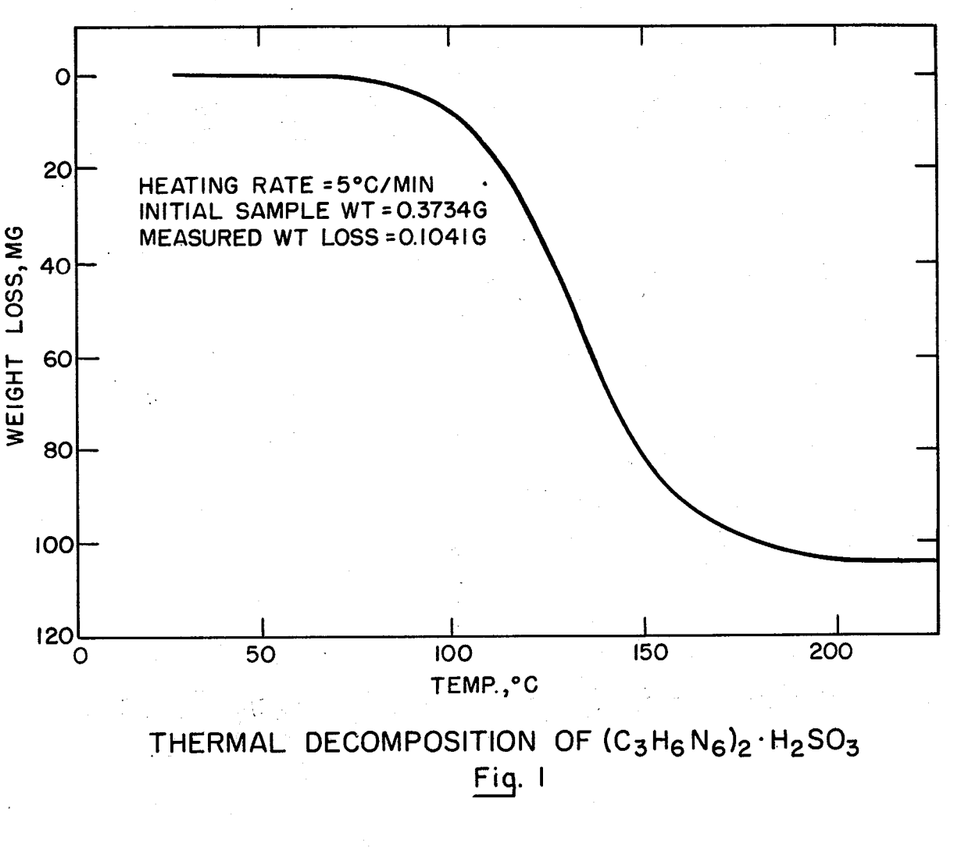
FIG. 1 is a thermogram from the thermogravimetric analysis of $(C_3H_6N_6)_2 \cdot H_2SO_3 \cdot 2H_2O$.

Referring now more specifically to FIG. 1, it is shown that at temperatures above about 105° C., melamine sulfites decompose rapidly with the formation of free melamine, sulfur dioxide, and water.

A similar thermogram, i.e., to that in FIG. 1, supra, is obtained for the thermogravimetric analysis of $(C_3H_6N_6)_3 \cdot (H_2SO_3)_2 \cdot 2H_2O$.

Waste gas streams usually contain oxygen in addition to sulfur dioxide. Part of the sulfur dioxide reacts with the oxygen and water during the scrubbing operation to form sulfuric acid. In our process, the sulfuric acid reacts with melamine to precipitate $(C_3H_6N_6)_2 \cdot H_2SO_4 \cdot 2H_2O$. The reactions are $$2SO_2 + O_2 + 2H_2O = 2H_2SO_4 \quad (21)$$

$$2C_3H_6N_6 + H_2SO_4 + 2H_2O = (C_3H_6N_6)_2 \cdot H_2SO_4 \cdot 2H_2O \quad (22)$$

Melamine sulfate cannot be decomposed thermally without decomposing the melamine. Therefore, the sulfuric acid must be separated from the melamine by other means. We have found that treatment of melamine sulfate with an aqueous solution of any base stronger than melamine produces free melamine and a solution of basic sulfate as in the reaction with ammonium hydroxide $$(C_3H_6N_6)_2 \cdot H_2SO_4 \cdot 2H_2O + 2NH_4OH = 2C_3H_6N_6 + (NH_4)_2SO_4 + 4H_2O \quad (23)$$

In many desulfurization processes, the oxidation of sulfur dioxide is reduced by the use of various oxidation inhibitors. In our process, we have found that para-phenylenediamine is effective in reducing oxidation.

Our invention overcomes many of the drawbacks, complications, and expenses associated with many other processes for the removal with recovery and without recovery of sulfur oxides from waste gas streams. Some advantages of our process are:

1. One of the most important is the relatively low temperature (100° to 150° C.) required for decomposition of melamine sulfite to regenerate the melamine absorbent. This low temperature allows all or a significant portion of the heat of decomposition to be extracted from the incoming, untreated waste gas by means of a heat exchanger. Thus, the need for all or a significant portion of the supplemental fuel required for generation of the much higher temperatures required for regeneration of the absorbents used in some other processes such as the Magnesium Oxide Scrubbing Process is eliminated.

2. No waste products are produced by our process and thus waste disposal problems such as are encountered in all throwaway-type processes are minimized.

3. Ninety percent or more of the sulfur oxides are recovered as sulfur dioxide, which is a highly versatile product, which may be used as such or from which either sulfuric acid or sulfur may be easily prepared. Some other processes such as the Citric Acid Process do not have this versatility.

4. Sulfate is recovered as ammonium sulfate which is a valuable and widely used fertilizer. In contrast, some other processes such as the Wellman-Lord and the Citric Acid produce the much less valuable sodium sulfate as byproduct.

5. Another advantage of our process is its relative simplicity and reliability. All processing steps proceed easily and without complication.

Other advantages of our process will become apparent from its detailed description.

Although our process can be used to remove sulfur oxides from a wide variety of waste gas streams, its greatest potential is for the desulfurization of flue gas from coal fired electric power plants. The untreated flue gas from these processes usually have temperatures equal to or greater than about 148° C. It is usually necessary to maintain this minimum temperature to prevent the condensation of sulfuric acid which would corrode the equipment. The gas contains large amounts of particulate matter mostly in the form of fly ash. The typical volume composition of flue gas from coal containing 3.5 percent sulfur is: $SO_2$-0.2 percent, $SO_3$-0.002 percent, $CO_2$-12 percent, $O_2$-5 percent, $N_2$-74 percent, $NO_x$ (as NO)-0.06 percent, $H_2O$-8.6 percent, HCl-0.01 percent, and trace amounts of other gases.

In many flue gas desulfurization processes and in all regenerative processes, it is necessary to prescrub the flue gas to remove particulate matter. The prescrubbing operation also removes substantially all of the sulfur trioxide and most of the hydrochloric acid. It also cools the gas and saturates it with water. In most processes, the temperature of gas leaving the prescrubber ranges from 50° to 56° C.; however, the gas can be discharged at lower temperatures, if necessary, for improving the overall economics of the desulfurization process.

In our process, the temperature of the prescrubbed flue gas dictates the temperature of the sulfur dioxide scrubbing step because if the temperature in the sulfur dioxide scrubber is lower than that of the incoming prescrubbed flue gas, water will be condensed since the gas is saturated. The condensation of appreciable amounts of water would upset the water balance and make it necessary to evaporate the condensed water.

The efficiency of our melamine scrubbing process decreases with increase in temperature. For example, at room temperature sulfur dioxide could not be detected in the exit gas from a single-stage melamine scrubbing system by an ultraviolet spectrophotometer having a sensitivity of about 10 ppm sulfur dioxide, but at 55° C. the exit gas contained about 124 ppm. At 71° C. very little sulfur dioxide was removed from a gas stream containing 2000 ppm. Since EPA emission regulations from typical flue gas from coal is about 450 ppm (Chaput, L. S., "Federal Standards of Performance for New Stationary Sources of Air Pollution," *J. Air Pollution Control Assoc.*, 26 (11), 1055, 1971), the maximum scrubbing temperature for meeting EPA regulations is between 55° and 71° C. However, it is preferred that the scrubbing temperature not exceed 55° C. because more than 92 percent of the sulfur oxides are removed from typical flue gases at this temperature. Since our process is even more efficient at lower scrubbing temperatures, there are no lower temperature limitations except those imposed by the temperature of the prescrubbed flue gas.

Although two hydrated melamine sulfite salts have been identified in the system $C_3H_6N_6:SO_2:H_2O$, substantially all of the sulfur dioxide in typical flue gas is converted to $(C_3H_6N_6)_2 \cdot H_2SO_3 \cdot 4H_2O$ at temperatures up to 56° C. Oxidized sulfur dioxide is converted to $(C_3H_6N_6)_2 \cdot H_2SO_4 \cdot 2H_2O$. Therefore, a minimum of two moles of free melamine per mole of sulfur in the prescrubbed flue gas must be present in the scrubbing system. In some modifications of the process and with some scrubbing system designs, it is desirable to operate with an excess of melamine to improve the efficiency of scrubbing.

Even damp melamine will absorb sulfur dioxide; therefore, there are no chemical restrictions on the concentration of the melamine slurry provided that there is sufficient water present for the formation of sulfurous and sulfuric acids. The restrictions on the concentrations of solids in the slurry are primarily physical since the slurry must be in a reasonably fluid state to facilitate stirring, transport, and efficient contact with the gas stream. In addition, it is desirable for the solids produced by the reactions of sulfurous and sulfuric acids to be in a crystalline form that filters easily. The maximum concentration of the slurry which gives good handling, easy filtration, and efficient contact with the gas stream will be determined by factors such as the design and number of scrubbers used, the type of stirring or other agitation or pumping devices employed, slurry temperature, and the steady state amounts of melamine sulfate contained in the system. Generally, however, a melamine concentration of about 50 percent is the maximum that is practical, and a concentration from about 5 to 20 percent is preferred.

As shown by FIG. 1, melamine sulfite decomposes rapidly at temperatures between about 105° and 200° C., and it is obvious that complete decomposition will occur at any temperature within this range. Temperatures higher than 200° C. should be avoided because melamine starts to sublime and decompose at higher temperatures. The actual maximum calcination temperature in a process will depend primarily on the temperature of the heat source; however, it is usually desirable not to exceed calcination temperatures of about 150° C. because decomposition is rapid enough at this temperature and the decomposition products must subsequently be cooled to about ambient temperatures.

The hot solids discharged from the melamine sulfite decomposer must be cooled to about ambient temperature before they are split into two streams for further processing. The portion that is recycled to the melamine slurry preparation step must be at a temperature that will not cause the temperature of the slurry to be higher than that required in the sulfur dioxide scrubbing step. In addition, the temperature of the melamine sulfate decomposer should be as low as practical to minimize the solubility of melamine in the basic sulfate salt solution withdrawn as product.

Solids from the cooler will consist of a mixture of melamine and melamine sulfate. This stream will be split into two unequal portions. The larger portion will be recycled to the melamine slurry preparation step and the smaller portion will be sent to the melamine sulfate decomposer. The ratio of solids recycled to those sent to the sulfate decomposer will depend upon the actual amount of oxidation and the desired steady state ratio of free melamine to melamine sulfate in the scrubbing step.

Figure 2:
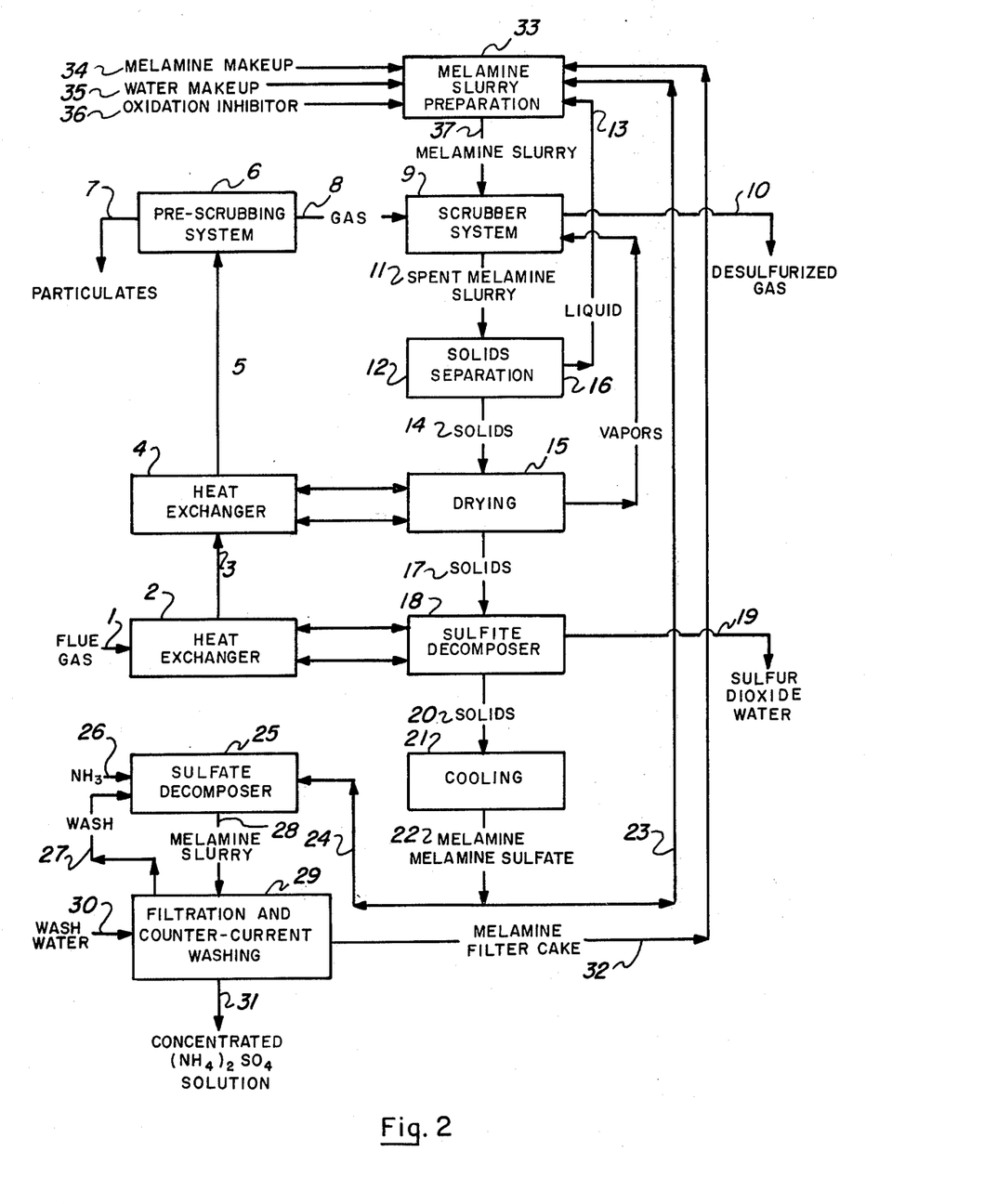
FIG. 2 is a flowsheet illustrating the principal novel process and its preferred embodiment for the desulfurization of flue gas from coalfired electric power plants.

Referring now more specifically to FIG. 2, therein is a flowsheet for a preferred embodiment of our process for the desulfurization of flue gas from coal-fired electric power plants which illustrates the general principles of our new and novel process for the removal and recovery of sulfur oxides from waste gases. The hot flue gas stream 1 is passed through heat exchangers 2 and 4 via lines 1 and 3 and then delivered via line 5 to prescrubber 6 where particulate matter is precipitated and the gas is cooled and saturated with water. Particulate matter is removed from prescrubber 6 via line 7 and the prescrubbed and cooled gas containing sulfur dioxide removed via line 8 and delivered to scrubbing system 9 where it is contacted with melamine slurry to remove sulfur oxides as solid melamine sulfites and melamine sulfate. The slurry temperature is maintained between 50° and 55° C., the weight percent of melamine in the slurry ranges from 10 to 20, and for each mole of input sulfur, 2 to 2.5 moles of free melamine are present. The desulfurized gas is withdrawn from scrubbing system 9 via line 10 and discharged to the atmosphere, or alternatively, to a mist eliminator and reheater and thence to the atmosphere. The spent and sulfur-laden melamine slurry is withdrawn from scrubbing system and delivered via line 11 to solid separation device 12. Liquid from solid separation device 12 is delivered via line 13 to melamine slurry preparation equipment 33 and the solids delivered via line 14 to drier 15 where adhering mother liquid, part of the water of hydration, and small amounts of sulfur dioxide are evaporated at temperatures from 55° C. to 105° C. with heat extracted from the incoming flue gas by heat exchanger 4. Vapors from the drier are delivered via line 16 to scrubbing system 9. Dry solid from the drier is delivered via line 17 to sulfite decomposer 18 where melamine sulfites are decomposed at temperatures from 105° to 148° C. into melamine, water, and sulfur dioxide with heat extracted from the incoming flue gas by heat exchanger 2. The sulfur dioxide and water mixture from sulfite decomposer 18 is withdrawn as product via line 19 and used as such or is converted to other products such as sulfur or sulfuric acid. The hot solids are withdrawn from the sulfite decomposer 18 via line 20 and delivered to cooling equipment 21 where they are cooled to about ambient temperature. The cooled solids consisting of melamine and melamine sulfate are withdrawn from the cooling equipment 21 via line 22 and split into two unequal sized streams. The larger stream is delivered via line 23 to melamine slurry preparation equipment 33 and the smaller stream is delivered via line 24 to sulfate decomposer 25. In melamine sulfate decomposer 25, the solid is treated at about ambient temperature with from 1.8 to 2.1 moles of ammonia delivered via line 26 per mole of contained sulfate and ammonium sulfate wash solution delivered via line 27 to convert the contained melamine sulfate to solid melamine and concentrated ammonium sulfate solution and the resulting reaction slurry withdrawn via line 28 and delivered to filtration and countercurrent washing equipment 29. The filtrate from filtration and countercurrent washing equipment 29 is concentrated ammonium sulfate solution containing small amounts of dissolved melamine and is withdrawn from the process as product via line 31. The filter cake is washed in a countercurrent manner with water introduced via line 30 to produce ammonium sulfate solution which is delivered via line 27 to sulfate decomposer 25. The washed filter cake is wet melamine and is delivered via line 32 to melamine slurry preparation equipment 33. Melamine makeup, water makeup (if needed), and an oxidation inhibitor makeup are added to melamine slurry preparation equipment 33 via lines 34, 35, and 36. The fresh melamine slurry is delivered to the scrubbing system via line 37.

In order that those skilled in the art may better understand how the present invention can be practiced and more fully and definitely understood, the following examples are given by way of illustration and not necessarily by way of limitation.

EXAMPLE I

A 500-ml three-necked flask equipped with a water-cooled condenser, stirrer, thermometer, and gas inlet tube was charged with 265 grams of an aqueous melamine slurry containing 24 percent melamine by weight. A stream of pure sulfur dioxide was introduced beneath the surface of the stirred melamine slurry and the addition of sulfur dioxide continued until it was first detected by wet acid test paper at the exit of the condenser. The temperature rose from 26° to 43° C. and the slurry became thick. The reaction slurry was filtered and the filter cake washed with 150 ml of water and dried on a clay plate at room temperature. The dry product weighed 87.3 grams and by analysis had the following composition:

| | Composition, weight % | | | |
| | sulfur | | $H_2O$ | Mole ratio, |
| N | total | sulfite | (by diff.) | melamine:S |
|---|---|---|---|---|
| 43.9 | 10.7 | 10.6 | 6.7 | 1.57 |

The composition shows that the filter cake contained one or more hydrated sulfite salts accompanied by a trace of melamine sulfate and that for each gram of melamine, 0.325 grams of sulfur dioxide was absorbed.

EXAMPLE II

A 1000-ml three-necked flask equipped with a water-cooled condenser, thermometer, stirrer, and a gas inlet tube was charged with 663 grams of an aqueous melamine slurry containing 9.5 percent melamine by weight. A stream of pure sulfur dioxide was introduced into the stirred melamine slurry through the inlet tube which extended under the surface of the slurry. The temperature rose from 26° to 40° C. and the slurry became thick. The reaction slurry was filtered—filtration was rapid—and the filter cake was washed with 150 ml of water and dried at room temperature. The dry cake weighed 83.7 grams and by analysis had the following composition:

| Composition, weight % | | | | |
|---|---|---|---|---|
| | sulfur | | $H_2O$ | Mole ratio, |
| N | total | sulfite | (by diff.) | melamine:S |
| 43.6 | 10.9 | 10.7 | 6.6 | 1.57 |

The composition shows that the filter cake contained one or more hydrated melamine sulfite salts accompanied by a trace of melamine sulfate and that for each gram of melamine, 0.33 grams of sulfur dioxide was absorbed.

EXAMPLE III

A 600-ml beaker was charged with 481 grams of an aqueous melamine slurry containing 17 percent melamine by weight. A stream of pure sulfur dioxide was introduced to the stirred melamine slurry through a gas inlet tube extending under the surface of the slurry. Reaction began immediately as evidenced by a change in slurry texture and a rise in temperature. The temperature rose from 26° to 47° C. The addition of sulfur dioxide was discontinued after the temperature began to fall. The reaction slurry became thick but still poured and filtered rapidly. The reaction slurry was filtered and the filter cake dried at 60° C. for 3.5 hours. The dry filter cake weighed 113 grams and by analysis had the following composition:

| Composition, weight % | | | | |
|---|---|---|---|---|
| | sulfur | | $H_2O$ | Mole ratio, |
| N | total | sulfite | (by diff.) | melamine:S |
| 44.9 | 10.7 | 10.5 | 5.23 | 1.60 |

The composition shows that the filter cake contained one or more hydrated melamine sulfite salts accompanied by a trace of melamine sulfate and that for each gram of melamine, 0.32 grams of sulfur dioxide was absorbed.

EXAMPLE IV

A 4000-ml beaker was charged with 3090 grams of an aqueous melamine slurry containing 3.1 percent melamine by weight. A stream of pure sulfur dioxide was introduced to the stirred slurry at room temperature through an inlet tube extending beneath the surface of the slurry. Reaction began immediately as evidenced by a change in slurry texture and a rise in temperature. The gas flow was terminated after the temperature peaked at 31° C.

The reaction slurry was filtered and the cake washed with 1000 ml of water and then dried in air at 60° C. for 6 hours. The dry filter cake weighed 98.9 grams and by chemical analysis had the following composition:

| Composition, weight % | | | | |
|---|---|---|---|---|
| | sulfur | | $H_2O$ | Mole ratio, |
| N | total | sulfite | (by diff.) | melamine:S |
| 49.0 | 8.1 | 7.8 | 5.7 | 2.31 |

The composition of the dry filter cake showed that it contained one or more hydrated melamine sulfite salts accompanied by a trace of melamine sulfate and for each gram of melamine, 0.218 grams of sulfur dioxide was absorbed.

EXAMPLE V

A gas absorption bottle was charged with 106 grams of an aqueous melamine slurry containing 5.6 percent melamine by weight. A gaseous stream comprised of 1 percent sulfur dioxide, 5 percent oxygen, and the rest as nitrogen was introduced beneath the surface of the stirred slurry at the rate of 530 cc per minute (STP). The test was made at room temperature. The effluent gas from the absorption bottle was connected to an ultraviolet spectrophotometer and monitored for its sulfur dioxide content. No sulfur dioxide was detected in the effluent gas during the first 110 minutes, but after 115 minutes the exit stream contained about 0.2 percent sulfur dioxide. The gas flow was terminated after 125 minutes.

The reaction slurry was filtered and the cake dried at room temperature in a stream of nitrogen. By chemical analysis, the cake had the following composition:

| Composition, weight % | | | | |
|---|---|---|---|---|
| | sulfur | | $H_2O$ | Mole ratio, |
| N | total | sulfite | (by diff.) | melamine:S |
| 46.1 | 8.35 | 7.39 | 9.00 | 2.11 |

Although the composition of the dried cake approached that of $(C_3H_6N_6)_2 \cdot H_2SO_3 \cdot 2H_2O$ (calculated composition: N = 45.39 percent, S = 8.66 percent, and $H_2O$ = 9.73 percent), it contained melamine sulfate. The difference between the total and sulfite sulfur shows that about 11.5 percent of the sulfur dioxide was oxidized. In addition, the analysis shows that each gram of melamine absorbed 0.24 gram of sulfur dioxide.

EXAMPLE VI

A gas absorption bottle was charged with 106 grams of an aqueous melamine slurry containing 5.6 percent melamine by weight. A gaseous stream comprised of 1.9 percent sulfur dioxide, 5 percent oxygen, and the rest as nitrogen was introduced beneath the surface of the stirred slurry at the rate of 510 cc per minute (STP). The test was conducted at room temperature. The gaseous output from the absorption bottle was connected to an ultraviolet spectrophotometer and monitored for its sulfur dioxide content. There was no sulfur dioxide detected in the exit gas during the first 51 minutes. The concentration of sulfur dioxide in the inlet gas stream was reduced to 0.2 percent after 51 minutes and the flow rate increased to 1200 cc per minute. After 18 minutes at the new flow rate, the concentration of sulfur dioxide in the exit stream reached 0.006 percent and after 99 minutes it reached 0.2 percent, the same as in the inlet stream, indicating that the system was saturated with sulfur dioxide.

The solid reaction product was isolated by filtration and dried at room temperature under a stream of nitrogen. By chemical analysis it had the following composition:

| Composition, weight % | | | | |
|---|---|---|---|---|
| | sulfur | | $H_2O$ | Mole ratio, |
| N | total | sulfite | (by diff.) | melamine:S |
| 45.5 | 8.6 | 7.84 | 9.3 | 2.02 |

Although the composition of the dried cake approached that of $(C_3H_6N_6)_2 \cdot H_2SO_3 \cdot 2H_2O$ (calculated composition shown in Example V), it contained melamine sulfate. The difference between the total and sulfite sulfur shows that about 8.8 percent of the sulfur dioxide was oxidized.

EXAMPLE VII

A gas absorption bottle was charged with 53 grams of an aqueous melamine slurry containing 5.6 percent melamine by weight. A gaseous stream comprised of 0.2 percent sulfur dioxide, 5 percent oxygen, and the rest as nitrogen was introduced beneath the surface of the stirred slurry at the rate of 990 cc per minute (STP). The test was made at room temperature. After 174 minutes, the pH of the reaction slurry was 4.6 and the first trace of sulfur dioxide was detected in the exit gases by wet pH test paper. When the run was terminated after 207 minutes, the final pH of the reaction slurry was 3.8.

The solid reaction product was isolated by filtration, dried at room temperature under a stream of nitrogen, and by chemical analysis had the following composition:

| N | Composition, weight % | | $H_2O$ (by diff.) | Mole ratio, melamine:S |
|---|---|---|---|---|
| | sulfur | | | |
| | total | sulfite | | |
| 44.8 | 8.20 | 3.19 | 9.2 | 2.08 |

The composition of the dried product corresponded to a mixture of hydrated melamine sulfites and sulfates. The difference between the total and sulfite sulfur showed that 61 percent of the sulfur dioxide was oxidized.

EXAMPLE VIII

A run was made using the same apparatus, the same amounts of melamine and water, and the same temperature as in Example VII. A gaseous stream comprised of 0.2 percent sulfur dioxide, 5 percent oxygen, 11.5 percent carbon dioxide, and the rest as nitrogen was introduced beneath the surface of the stirred slurry at the rate of 1000 cc per minute (STP). The sulfur dioxide content of the exit gas was monitored by ultraviolet spectrophotometry. No sulfur dioxide was detected in the exit gas until after 207 minutes. At this time the exit gas contained 0.002 percent sulfur dioxide and the reaction slurry had a pH of 4.1. When the run was terminated after 223 minutes, the exit gas contained 0.05 percent sulfur dioxide and the pH of the reaction slurry was 3.62.

The solid reaction product was isolated by filtration, dried at room temperature under a stream of nitrogen, and by chemical analysis had the following composition:

| N | Composition, weight % | | $H_2O$ (by diff.) | Mole ratio, melamine:S |
|---|---|---|---|---|
| | sulfur | | | |
| | total | sulfite | | |
| 46.5 | 8.05 | 4.29 | 7.7 | 2.20 |

The composition of the dried product corresponded to a mixture of hydrated melamine sulfites and sulfates. The difference between the total and sulfite sulfur indicated that 47 percent of the sulfur dioxide was oxidized.

Except for the presence of carbon dioxide, the experimental conditions of the run were substantially the same as those of Example VII. The presence of carbon dioxide did not materially reduce the capacity of the melamine to absorb sulfur dioxide and may have been beneficial in reducing the amount of oxidation.

EXAMPLE IX

A run was made using the same experimental conditions as in Example VIII except that 0.053 grams para-phenylenediamine (a compound used as an oxidation inhibitor) was added. No sulfur dioxide was detected in the exit gases until after 250 minutes. After 252 minutes the exit gas stream contained 0.03 percent sulfur dioxide and the pH of the slurry was 3.98. The run was terminated after 256 minutes; at this time, the exit gas contained 0.06 percent sulfur dioxide and the pH of the reaction slurry was 3.8.

The solid reaction product was isolated by filtration, dried under a stream of nitrogen at room temperature, and by chemical analysis had the following composition:

| N | Composition, weight % | | $H_2O$ (by diff.) | Mole ratio, melamine:S |
|---|---|---|---|---|
| | sulfur | | | |
| | total | sulfite | | |
| 44.2 | 8.4 | 8.3 | 12.1 | 2.01 |

The composition of the dried cake approached that of $(C_3H_6N_6)_2 \cdot H_2SO_3 \cdot 2H_2O$— calculated composition: 45.39 percent N, 8.66 percent S, 9.73 percent $H_2O$. It contained a trace of melamine sulfate corresponding to 1.1 percent oxidation of the sulfur dioxide. This sample shows that the oxidation inhibitor was very effective in suppressing oxidation.

EXAMPLE X

A gas stream containing 75 percent sulfur dioxide and 25 percent nitrogen was added to a slurry consisting of 300 grams water, 12 grams melamine, and 0.2 grams para-phenylenediamine at the rate of 300 cc per minute (STP) for 60 minutes. The test was made at room temperature, but the reaction slurry became warm. The solid reaction product was isolated by filtration on a coarse glass frit under vacuum. The solid was dried under a stream of nitrogen for 3½ days and analyzed both chemically and petrographically. The composition of the dried solid was:

| N | Composition, weight % | | $H_2O$ (by diff.) |
|---|---|---|---|
| | sulfur | | |
| | total | sulfite | |
| 43.6 | 11.01 | 11.01 | 6.42 |

The above weight percent composition corresponded to the molar composition $(C_3H_6N_6)_{1.51} \cdot H_2SO_3 \cdot 1.04 H_2O$. Petrographic examination of the dry solid showed it to consist of a single homogeneous, crystalline phase and that the solid was the same as the major phase in the dried solids from Examples I, II, and III. These data show that the dried compound formed at high concentrations of sulfur dioxide is $(C_3H_6N_6)_3 \cdot (H_2SO_3)_2 \cdot 2H_2O$.

EXAMPLE XI

A gas stream containing 1 percent sulfur dioxide and the rest as nitrogen was added to a slurry consisting of 100 cc water, 6 grams melamine, and 0.1 percent para-phenylenediamine at the rate of 1000 cc per minute (STP) for 2 hours. The test was made at room temperature. The solid reaction product was isolated by filtration on a coarse frit under vacuum and dried for 3½ days under a stream of nitrogen. The dried product waas analyzed both chemically and petrographically. The composition of the dried product corresponded to $(C_3H_6N_6)_{1.52} \cdot H_2SO_3 \cdot 1.08H_2O$ and petrographic examination showed it to consist of a single, homogeneous, crystalline phase that was the same as that found in Example X.

Another test was made as above and the solid reaction phase examined petrographically in the presence of the mother liquor. The results showed that it was the same as the dried compound. Therefore, the final compound formed in the reaction slurry at concentrations of 1 percent or more sulfur dioxide is $(C_3H_6N_6)_3 \cdot (H_2SO_3)_2 \cdot 2H_2O$.

EXAMPLE XII

A test was made using the same gas and slurry compositions and other experimental conditions as were used in Example XI. However, the gas flow was stopped after one hour when sulfur dioxide first appeared in the exit gas stream. The solid reaction product was isolated by filtration, dried 3½ hours under a stream of nitrogen, and analyzed both chemically and petrographically. Chemical analysis showed the dry product to have the composition $(C_3H_6N_6)_{2.05} \cdot H_2SO_3 \cdot 1.81H_2O$. Petrographic examination showed the dried product to exist as pseudomorphs.

EXAMPLE XIII

A test was made at ambient temperature using the same gas and slurry compositions as were used in Example XII. The gas was added to the slurry at the rate of 500 cc per minute (STP) for 2 hours at which time sulfur dioxide first was detected in the exit gas. A portion of the slurry was filtered and the cake dried quickly with acetone and then analyzed both chemically and petrographically. By chemical analysis the cake had the composition $(C_3H_6N_6)_{2.00} \cdot H_2SO_3 \cdot 4.07H_2O$. Petrographic examination showed the cake to consist of a single, homogeneous, crystalline phase; however, after the cake had stood overnight exposed to air, the crystals decomposed and then existed as pseudomorphs similar to those of Example XII, supra.

Another portion of the quick-dried sample was dried under nitrogen for 10 days. The sample lost 11 percent of its weight the first day of drying and then slowly lost additional weight during the last nine days for a total weight loss of 16.15 percent. The sample was still losing weight when the drying was stopped. Chemical analysis of the cake after drying for 10 days showed the composition to be

| | Composition, weight % | | | Mole ratio, |
|---|---|---|---|---|
| | sulfur | | $H_2O$ | |
| N | total | sulfite | (by diff.) | melamine:S |
| 49.3 | 7.17 | 7.17 | 7.69 | 2.62 |

This example combined with Example XII shows that the first compound to form at 1 percent sulfur dioxide and 25° C. is $(C_3H_6N_6)_2 \cdot H_2SO_3 \cdot 4H_2O$. On drying even at room temperature, the compound loses both water and sulfur dioxide, the loss of water being considerably faster than the loss of sulfur dioxide.

EXAMPLE XIV

A gas stream containing 0.2 percent sulfur dioxide, 5 percent oxygen, 12 percent carbon dioxide, and the rest as nitrogen was added at the rate of 1000 cc per minute (STP) to a slurry comprised of 2.95 grams melamine, 0.005 grams para-phenylenediamine, and 50 grams water. The temperature of the slurry was maintained at 55° C. The concentration of sulfur dioxide in the exit gas was monitored with an ultraviolet spectrophotometer. About 0.0024 percent sulfur dioxide was present in the exit gas after 15 minutes and the slurry pH was 4.9. The slurry continued to remove more than 90 percent of the sulfur dioxide for the next 115 minutes and the pH of the slurry remained between 4.9 and 5.0. The pH of the slurry then began to drop and the sulfur dioxide in the exit gas began to increase. After 190 minutes of scrubbing time, the pH was 4.3 and the exit gas contained 0.2 percent sulfur dioxide. Scrubbing was continued for an additional 125 minutes and then the reaction slurry was filtered and the cake dried under nitrogen and analyzed. The analysis showed the dry cake to have the following composition: $(C_3H_6N_6)_{2.00} \cdot 0.97H_2SO_3 \cdot 0.03H_2SO_4 \cdot 2.11H_2O$. This example shows that, although scrubbing efficiency is decreased somewhat at 55° C., sulfur dioxide removal is still adequate to meet air pollution regulations. The example also shows that the oxidation inhibitor is effective in holding oxidation to about 3 percent at 55° C.

EXAMPLE XV

A test was made as in Example XIV except that the filter cake was dried on the filter by sucking air through it for 15 minutes to give a dry free-flowing powder. A portion of the cake was analyzed without further drying and another portion was further dried for 3 days under a stream of nitrogen and then analyzed. The air-dried portion had the following composition:

| | Composition, weight % | | | Mole ratio | |
|---|---|---|---|---|---|
| | sulfur | | $H_2O$ | | |
| N | total | sulfite | (by diff.) | melamine:S | |
| 41.4 | 7.93 | 7.69 | 17.60 | 1.99 | 3.95 |

The molar composition of the solids dried on the filter closely approached $(C_3H_6N_6)_2 \cdot H_2SO_3 \cdot 4H_2O$ and the molar composition of the solids dried under nitrogen was $(C_3H_6N_6)_{1.99} \cdot 0.97H_2SO_3 \cdot 0.03 H_2SO_4 \cdot 2.11H_2O$ and petrographic examination showed it to consist of pseudomorphs of a higher hydrate. Therefore, the same melamine sulfite is formed at 55° C. as at 25° C. with a gas stream containing 0.2 percent sulfur dioxide.

EXAMPLE XVI

A gas stream containing 0.2 percent sulfur dioxide, 5 percent oxygen, 12 percent carbon dioxide, and the rest as nitrogen was added at the rate of 1000 cc per minute to a slurry containing 2.95 grams melamine, 0.01 gram para-phenylenediamine, and 50 grams water. The temperature of the slurry was maintained at 71° C. Relatively high concentrations of sulfur dioxide were detected in the exit gas stream from the outset of the test. The addition of gas was continued for 264 minutes, during which time approximately a 100 percent excess of sulfur dioxide over that required for formation of $(C_3H_6N_6)_2 \cdot H_2SO_3 \cdot 4H_2O$ was added. The solid reaction product was isolated by filtration and the cake dried under nitrogen and chemically analyzed. The molar ratio of the filter cake was $C_3H_6N_6:H_2SO_3:H_2SO_4:H_2O = 3.79:0.26:0.74:3.9$.

This example shows that scrubbing efficiency is decreased markedly at 71° C. At this temperature, vapor pressure of sulfur dioxide over the melamine sulfite was close to the partial pressure of the input gas so that most of the sulfur that was precipitated was in the form of sulfate.

EXAMPLE XVII

A gas stream containing 0.2 percent sulfur dioxide, 5 percent oxygen, 12 percent carbon dioxide, and the rest as nitrogen was added to a slurry comprised of 2.95 grams melamine, 0.01 gram para-phenylenediamine (antioxidant), and 50 grams water. The temperature of the slurry was maintained at 55° C. The gas was added to the slurry for 4 hours at the rate of 1000 cc per minute. The reaction slurry was filtered, 2.4 grams of fresh melamine added to the filtrate, and the gas added at the same rate for 3 hours to the new slurry. The new reaction slurry was then filtered. The filtrate was tested in this manner through three additional cycles for a total of five cycles. The solids from each test were dried under a stream of nitrogen and then chemically analyzed to determine the amount of oxidation.

The results are tabulated below along with those of an identical blank run of 2 cycles in which no antioxidant was added.

| Cycle | Time, hour | 0.02% Antioxidant | | No antioxidant | |
|---|---|---|---|---|---|
| | | Percent oxidation | Mole ratio $C_3H_6N_6:S$ | Percent oxidation | Mole ratio $C_3H_6N_6:S$ |
| 1 | 4 | 1.3 | 1.82 | 31.3 | 2.00 |
| 2 | 3 | 0.0 | 2.07 | 36.0 | 1.99 |
| 3 | 3 | 1.6 | 1.98 | | |
| 4 | 3 | 1.8 | 1.99 | | |
| 5 | 3 | 1.6 | 2.00 | | |

This example shows that the antioxidant did not lose its effectiveness during 5 scrubbing cycles at 55° C.

EXAMPLE XVIII

An $N_2$ gas stream containing 0.05 percent $SO_2$ was added at the rate of 1000 cc/min (STP) to a slurry containing 2.5 g of melamine and 47.5 ml of water. Temperature of the slurry was 50° C. After 495 minutes scrubbing the $SO_2$ content of the exit gas, which was measured using a Du Pont 411 photometric analyzer, reached 0.02 percent. Average exit $SO_2$ up to this time was 0.013 percent. The run was continued for an additional 183 minutes until the exit gas from the scrubber contained 0.05 percent $SO_2$. Final slurry pH was 4.3. The solid reaction product was isolated by filtration, dried under $N_2$ at room temperature, and analyzed.

| N | Composition, weight % | | Mole ratio: melamine/S |
|---|---|---|---|
| | Sulfur | | |
| | total | sulfite | |
| 44.5 | 8.5 | 7.91 | 2.00 |

This example shows that a 5 percent melamine slurry will remove a large portion of the $SO_2$ from a 500 ppm $SO_2$ gas stream.

EXAMPLE XIX

This test was the same as Example XVIII except that the inlet gas contained 12 percent $CO_2$. The $SO_2$ content of the exit gas reached 0.02 percent after 511 minutes scrubbing. Average exit $SO_2$ up to this time was 0.010 percent. Scrubbing was continued for an additional 153 minutes until the exit and inlet gas were the same (0.05 percent $SO_2$). The solid reaction product was isolated by filtration, dried under a stream of $N_2$ at room temperature and analyzed.

| N | Composition, weight % | | Mole ratio: melamine/S |
|---|---|---|---|
| | Sulfur | | |
| | total | sulfite | |
| 45.2 | 8.6 | 8.14 | 2.00 |

This example shows that $CO_2$ does not affect the reaction of melamine slurry with 0.05 percent $SO_2$.

EXAMPLE XX

An $N_2$ gas stream containing 0.01 percent $SO_2$ was added at the rate of 1000 cc/min (STP) to a slurry prepared by adding 2.5 g of melamine to 47.5 ml of water. The slurry was at room temperature (23°–25° C.). After 2463 minutes scrubbing, the $SO_2$ content of the exit gas, which was measured using a Du Pont 411 photometric analyzer, reached 0.008 percent. Average exit $SO_2$ up to this time was 0.004 percent. Scrubbing was continued for an additional 67 minutes until the exit gas contained 0.01 percent $SO_2$. The solid reaction product was isolated by filtration, dried under $N_2$ at room temperature and analyzed.

| N | Composition, weight % | | Mole ratio: melamine/S |
|---|---|---|---|
| | Sulfur | | |
| | total | sulfite | |
| 45.1 | 8.6 | 7.37 | 2.00 |

This example shows that, at room temperature, a 5 percent melamine slurry will remove about 60 percent of the $SO_2$ from a very dilute $SO_2$ gas stream.

EXAMPLE XXI

An $N_2$ gas stream containing 0.01 percent $SO_2$ and 5 percent $O_2$ was added at the rate of 1000 cc/min. (STP) to a slurry prepared by adding 2.5 g of melamine and 0.05 g of paraphenylenediamine to 47.5 ml of water. The slurry was at room temperature (22°–23° C.). After 2535 minutes scrubbing, the $SO_2$ content of the exit gas which was measured using a Du Pont 411 photometric analyzer, reached 0.008 percent. Average exit $SO_2$ up to this time was 0.004 percent. Scrubbing was continued for an additional 73 minutes until the exit gas contained 0.01 percent $SO_2$. The solid reaction product was isolated by filtration, dried under $N_2$ at room temperature, and analyzed.

| N | Composition, weight % | | Mole ratio: melamine/S |
|---|---|---|---|
| | Sulfur | | |
| | total | sulfite | |
| 44.4 | 8.7 | 7.83 | 1.95 |

This example demonstrates the effectiveness of the antioxidant when scrubbing very dilute $SO_2$ gas streams containing oxygen.

EXAMPLE XXII

An $N_2$ gas stream containing 0.19 percent $SO_2$ was added at the rate of 1000 cc/min (STP) to a slurry prepared by adding 2.5 g of melamine to 47.5 ml of water. Temperature of the slurry was 24° C. At "steady state," the slurry removed 97 percent of the $SO_2$ from the incoming gas stream.

The above test was repeated at 50° C. and $SO_2$ removal at steady state was decreased to 93 percent. The test was repeated again at 70° C. Initially $SO_2$ removal was good, but it decreased gradually with time. The percent $SO_2$ removal was 90.5, 70.1, 41.8, 36.5, 29.1, 12.7, and 4.8 after 20, 50, 120, 150, 200, 250, and 300 minutes scrubbing, respectively. Scrubbing was stopped after 309 minutes, the solid reaction product was isolated by filtration, dried under $N_2$ at room temperature and analyzed.

| N | Composition, weight % | | Mole ratio: melamine/S |
|---|---|---|---|
| | Sulfur | | |
| | total | sulfite | |
| 46.0 | 8.4 | 7.82 | 2.09 |

This example shows that the scrubbing efficiency of melamine slurry decreases with increasing slurry temperature.

EXAMPLE XXIII

A sample of the produce from Example V was subjected to thermogravimetric analysis. The sample (0.373 g) was heated at the rate of 5° C. per minute in a stream of air from room temperature to 200° C. (see FIG. 2). The sample began to lose weight as water above 65° C. as evidenced by the neutral reaction to wet pH test paper. In the 100° to 150° C. range, the loss of weight as water and sulfur dioxide as evidenced by the acid reaction to wet pH test paper was rapid and decomposition was complete at 200° C. The sample lost a total of 0.1041 grams, whereas, the calculated weight loss for water and sulfur dioxide was 0.1042 grams. The residue contained 96.5 percent melamine by chemical analysis with the difference being sulfuric acid. These results demonstrate that substantially all the sulfite in melamine sulfite is released as sulfur dioxide and water between 100° and 200° C.

EXAMPLE XXIV

A sample of pure melamine sulfate dihydrate $[(C_3H_6N_6)_2 \cdot H_2SO_4 \cdot 2H_2O]$ was subjected to thermogravimetric analysis. The sample was heated at the rate of 5° C. per minute. Hydrated water but no sulfur oxide was lost between 110° and 200° C. A basic gas was evolved between 332° and 430° C. showing that the melamine was decomposing.

EXAMPLE XXV

A slurry of 9 grams melamine sulfate dihydrate in 100 grams water was treated with 1.3 times the stoichiometric amount of concentrated ammonium hydroxide and the mixture stirred for 1 hour at room temperature and then filtered. The cake was washed with 30 ml water and dried at 60° C. Analysis of the dried cake showed it to be essentially pure melamine and to contain only 0.07 percent sulfur. The combined filtrate and wash contained 0.738 g sulfur which corresponds to 99 percent regeneration of melamine.

EXAMPLE XXVI

Slurries containing 4.5 grams of $(C_3H_6N_6)_2 \cdot H_2SO_4 \cdot 2H_2O$ and 50 grams water were treated with KOH solutions under the conditions tabulated below. The reaction mixtures were filtered and the cakes washed with five 20-ml portions of water. The washed and dried cakes were analyzed for sulfur and potassium and the combined filtrates and washes for sulfur. All of the melamine cakes contained less than 0.01 percent potassium and the distribution of sulfur given in the tabulation shows that more than 98 percent of the melamine was regenerated in all but one case.

| Reaction conditions | | | | Distribution of sulfur, % | |
|---|---|---|---|---|---|
| $KOH:H_2SO_4$ | gKOH/ 100 cc solution | Time, mins. | Temp., °C | Melamine cake | Filtrate and wash |
| 2.0 | 40 | 25 | 25 | 1.6 | 98.4 |
| 2.2 | 40 | 17 | 25 | 0.5 | 99.5 |
| 2.0 | 40 | 17 | 25 | 1.1 | 98.9 |
| 2.4 | 40 | 17 | 25 | 0.3 | 99.7 |
| 2.2 | 50 | 17 | 25 | 0.3 | 99.7 |
| 2.2 | 30 | 17 | 25 | 0.5 | 99.5 |
| 2.2 | 40 | 17 | 25 | 1.3 | 98.7 |
| 2.2 | 40 | 5 | 25 | 6.9 | 93.1 |
| 2.2 | 40 | 5 | 43 | 0.0 | 100.0 |

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A process for the removal and recovery of sulfur oxides from gas streams, said gas streams containing from 1 percent to 100 percent sulfur oxides by volume, which comprises the steps of:
   1. contacting said gas stream in a scrubbing system with an aqueous slurry of melamine containing an oxidation inhibitor to produce a mixture of insoluble hydrated melamine sulfites and melamine sulfate while maintaining the temperature of the slurry between 20° C. and 70° C.; wherein for each mole of sulfur added in said gas stream, from 1.5 to 2.5 moles of free melamine are present in the slurry and for each pound of slurry from 0.01 to 0.5 pound of melamine is present;
   2. removing the resulting reaction product slurry from the scrubbing system and separating the solids in said reaction slurry from the liquid;
   3. recycling the clarified liquid phase from step 2 supra back to step 1 supra;
   4. drying the separated solids from step 2 supra at temperatures between 70° C. and 105° C. to remove adhering liquid, part of the water of hydration, and a small amount of sulfur dioxide;
   5. recycling the vapors from step 4 supra back to step 1 supra;
   6. heating the dried solids from step 5 supra at temperatures from 105° C. to 200° C. thereby effecting the decomposition of the melamine sulfite into solid, free melamine and gaseous water and sulfur dioxide;
   7. withdrawing the gaseous mixture of water and sulfur dioxide from step 6 supra as product;

8. cooling the hot solids from step 6 supra to about ambient temperature and then splitting said solids into two unequal streams;
9. recycling the larger portion of the cooled solids from step 8 supra to step 1 supra;
10. contacting the smaller portion of the cooled solids from step 8, supra, with an aqueous solution of a base stronger than melamine to convert the melamine sulfate contained in said solids into free, solid melamine and a solution of a basic sulfate salt while maintaining the temperature of the resulting reaction slurry at about ambient values; wherein for each mole of sulfate in said cooled solids, 1.5 to 2.1 chemical equivalents of the base is used;
11. separating the solids from the basic sulfate salt solution from step 10, supra, and withdrawing the basic sulfate salt solution as product;
12. washing the solids from step 11 supra with water; using the wash in step 10 supra, and recycling the washed solids back to step 1, supra.

2. A process according to claim 1 wherein para-phenylenediamine is used as an oxidation inhibitor.

3. A process for the removal and recovery of sulfur oxides from gas streams, said gas streams containing sulfur oxides in the range of 0.01 percent to 1 percent by volume, which comprises the steps of:

1. contacting said gas stream in a scrubbing system with an aqueous slurry of melamine containing an oxidation inhibitor to produce a mixture of insoluble hydrated melamine sulfites and melamine sulfate while maintaining the temperature of the slurry between 20° C. and 56° C.; wherein for each mole of sulfur added in said gas stream, from 2.0 to 2.5 moles of free melamine are present in the slurry and for each pound of slurry, from 0.01 to 0.20 pound of melamine is present;
2. removing the resulting reaction product slurry from the scrubbing system and separating the solid in said reaction slurry from the liquid;
3. recycling the clarified liquid phase from step 2 supra back to step 1 supra;
4. drying the separated solids from step 2 supra at temperatures between 56° C. and 105° C. to remove adhering liquid, part of the water of hydration, and a small amount of sulfur dioxide;
5. recycling the vapor from step 4 supra back to step 1 supra;
6. heating the dried solids from step 5 supra at temperatures from 105° to 200° C. thereby effecting the decomposition of the melamine sulfite into solid, free melamine and gaseous water and sulfur dioxide;
7. withdrawing the gaseous mixture of water and sulfur dioxide from step 6 supra as product;
8. cooling the hot solids from step 6 supra to about ambient temperature and then splitting said solids into two unequal streams;
9. recycling the larger portion of the cooled solids from step 8 supra to step 1 supra;
10. contacting the smaller portion of the cooled solids from step 8 supra with an aqueous solution of a base stronger than melamine to convert the melamine sulfate contained in said solids into free, solid melamine and a solution of basic sulfate salt while maintaining the temperature of the resulting reaction slurry at about ambient values; wherein for each mole of sulfate in said cooled solids, 1.8 to 2.1 chemical equivalents of the base is used;
11. separating the solids from the basic sulfate salt solution from step 10 supra and withdrawing the basic sulfate salt solution as product;
12. washing the solids from step 11 supra with water; using the wash in step 10 supra, and recycling the washed solids back to step 1 supra.

4. A process according to claim 1 wherein para-phenylenediamine is used as an oxidation inhibitor.

* * * * *

UNITED STATES PATENT AND TRADEMARK OFFICE
CERTIFICATE OF CORRECTION

PATENT NO. : 4,139,597
DATED : February 13, 1979
INVENTOR(S) : John J. Kohler, Joe Gautney, Yong K. Kim and John F. McCullough It is certified that error appears in the above-identified patent and that said Letters Patent are hereby corrected as shown below:

Column 1, line 63, after "EPA" change "Repot" to -- Report --
Column 6, line 17, change "reacti" to -- reacting --
Column 9, line 7, change "generation" to -- regeneration --
Column 22, first column of the table, about line 18, above "KOH:$H_2SO_4$"
        add -- Mole ratio --
Column 24, claim 4, after "according to" change "claim 1" to --claim 3 --

Signed and Sealed this

Fifteenth Day of May 1979

[SEAL]

Attest:

RUTH C. MASON
Attesting Officer

DONALD W. BANNER
Commissioner of Patents and Trademarks